United States Patent [19]

Sundholm

[11] Patent Number: 5,826,663

[45] Date of Patent: Oct. 27, 1998

[54] SYSTEM FOR FIGHTING FIRES

[76] Inventor: Göran Sundholm, Ilmari Kiannon kuja 3, FIN-04310 Tuusula, Finland

[21] Appl. No.: 492,034

[22] PCT Filed: Jan. 21, 1994

[86] PCT No.: PCT/FI94/00025

§ 371 Date: Jul. 21, 1995

§ 102(e) Date: Jul. 21, 1995

[87] PCT Pub. No.: WO94/16770

PCT Pub. Date: Aug. 4, 1994

[30] Foreign Application Priority Data

Jan. 21, 1993 [FI] Finland .................................... 930233

[51] Int. Cl.⁶ .................................................. A62C 27/00
[52] U.S. Cl. .................................. 169/24; 169/9; 169/13; 169/16
[58] Field of Search ................................. 169/24, 9, 13, 169/16

[56] References Cited

U.S. PATENT DOCUMENTS

| 329,585 | 11/1885 | Miller | 169/16 |
|---|---|---|---|
| 2,353,117 | 7/1944 | Rider | 169/9 |
| 3,372,875 | 3/1968 | Torrey | 169/24 |
| 3,878,896 | 4/1975 | White et al. | 169/9 |
| 3,981,618 | 9/1976 | Nelson | 169/24 |
| 4,162,714 | 7/1979 | Correll | 169/24 |
| 4,345,654 | 8/1982 | Carr | 169/24 |
| 4,593,855 | 6/1986 | Forsyth | 169/24 |

FOREIGN PATENT DOCUMENTS

| 2075397 A1 | 2/1993 | Canada | 169/16 |
|---|---|---|---|
| 0249529 | 12/1987 | European Pat. Off. | |
| 2599679 | 12/1987 | France | |
| 3825078 | 1/1990 | Germany | |
| 406039053 A | 2/1994 | Japan | 169/16 |
| 1563710 | 5/1990 | U.S.S.R. | 169/24 |
| 2248884 | 4/1992 | United Kingdom | |
| 9215370 | 9/1992 | WIPO | |
| 9220453 | 11/1992 | WIPO | |
| 9220454 | 11/1992 | WIPO | |
| 9222353 | 12/1992 | WIPO | |
| 9300962 | 1/1993 | WIPO | |
| 9310859 | 6/1993 | WIPO | |
| 9310860 | 6/1993 | WIPO | |
| 9310861 | 6/1993 | WIPO | |

*Primary Examiner*—Gary C. Hoge
*Attorney, Agent, or Firm*—Ladas & Parry

[57] ABSTRACT

The object of the invention is to provide a new fire protection system for hotels, office buildings, industrial plants or whole communities. The unit which is to be protected is provided with an automatic fire fighting installation preferably operated by high pressure hydraulic accumulators, for initial fighting of a fire in order to at least suppress the fire. The fire is finally extinguished with the help of a fire truck with a water tank connectable via a high pressure pump (3) in the truck to the said fire fighting installation. The drive shaft of the pump is connected to the cardan shaft (6) of the truck engine (1) for utilizing the total power of the engine. The fire truck can be made small and the system, operating with a small amount of water, is in particular of advantage for warm regions with limited or scarce water resources.

9 Claims, 1 Drawing Sheet

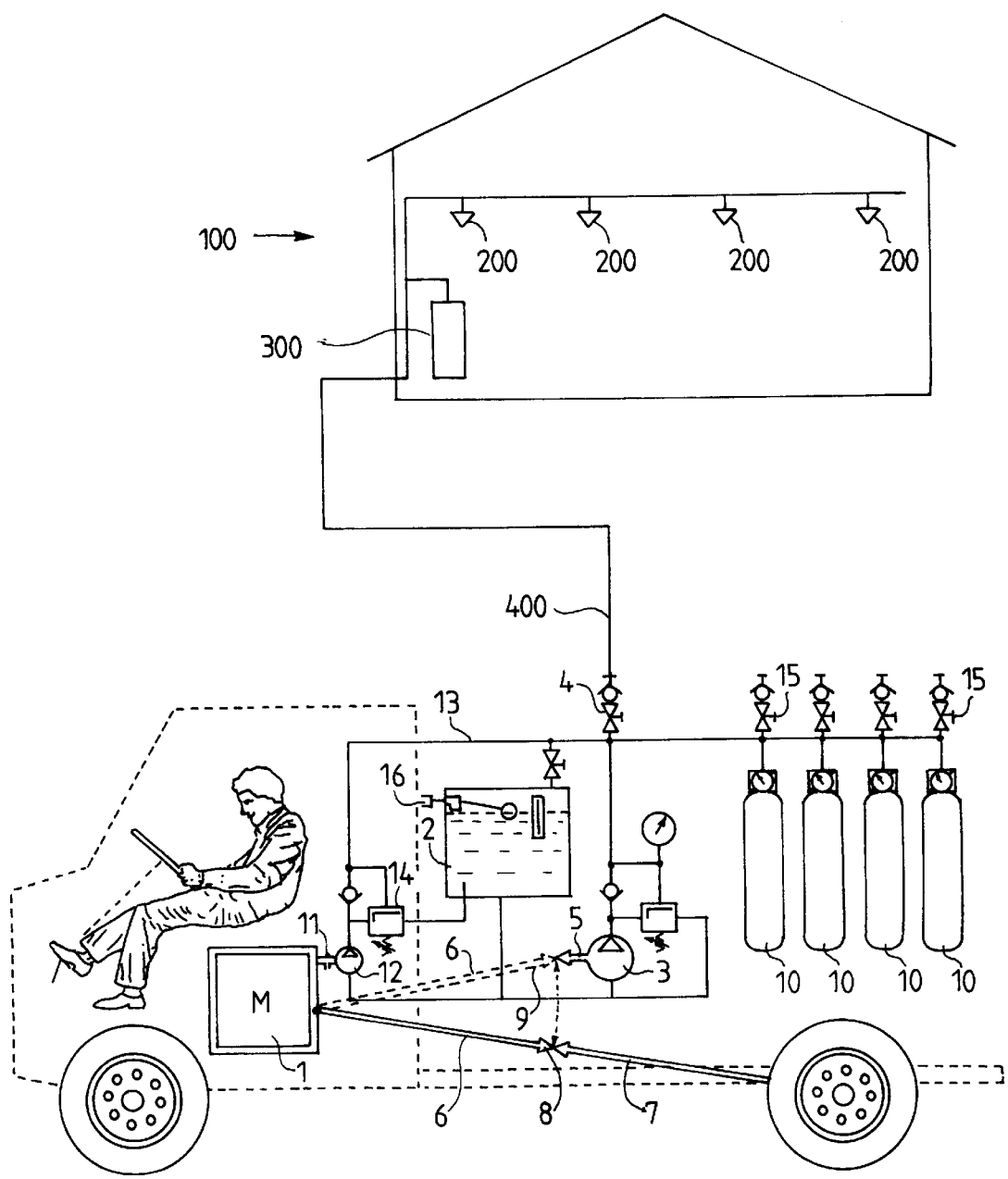

SYSTEM FOR FIGHTING FIRES

The present invention relates to a system for fighting fires, especially for hotels, office buildings, industrial plants or even communities.

Conventional sprinkler installations require large amounts of water, which especially in southern, dry countries has presented difficulties with the water supply. One has had to build large reservoirs of water and pump stations in order to secure the operation of the sprinkler installations. The installations är usually electrically operated, but because one cannot rely on supply of electric power, especially in the case of serious fires, one has had to keep e.g. diesel driven pumps in addition to the electrically driven pumps, or diesel driven generators.

Such known installations for fighting fires are very expensive.

The object of the invention is to provide a new system for fighting fires, which is reliable and simple and thus cheap.

The system according to the invention is mainly characterized in that the unit which is to be protected is provided with at least one such an automatic fire fighting installation, known per se, that is arranged to at a high pressure (usually about 100–300 bar) spray a fog-like extinguishing liquid, with small droplets, and which is arranged to be operated by means of accumulated energy, preferably hydaulic accumulators, for initial fighting of a fire broken out, and that the final fighting of the fire is arranged to be done with the help of a fire truck provided with a water tank and a high pressure pump.

The hydraulic accumulators of the fire fighting installation are preferably dimensioned such that liquid fog can be sprayed until the fire truck gets to place, which can be expected to take some ten minutes.

By somewhat "normal" fires said fire fighting installation with hydraulic accumulators is capable of extinguishing the fire or at least suppressing it until the fire truck has arrived, whereat the final extinguishing in many cases can be carried out by means of portable hand extinguishers.

In case of a serious fire or a so-called smouldering fire this, however, is not always so, whereat the final fighting of the fire is arranged to be carried out by connecting the water tank of the fire truck via the high pressure pump to said fire fighting installation.

The system according to the invention requires no large water reservoires and is neither dependent on electric power. If the unit to be protected is large one can of course keep two or more fire trucks.

The invention also relates to a new fire truck.

In known fire trucks, the power of the water pump is taken from a power takeout connected to the drive engine of the truck. The power available to the water pump is hereby only a relatively small portion (about 10%) of the total power of the drive engine. With respect to a use here contemplated, known fire trucks are, in addition, unnecessary large, whereby they are expensive and cannot pass through narrow passages.

The fire truck according to the invention has a water tank and a high pressure pump. The drive shaft of the pump is arranged to by means of a quick-coupling, which is known as such, be connected to the cardan shaft of the fire truck. Thanks to this, the water pump can utilize the whole power of the truck engine. The truck engine, and thus the whole fire truck, can be made considerably smaller than before.

In a preferable embodiment, the fire truck is also provided with at least one hydraulic accumulator which is connectable to the fire fighting installation for the time it takes to connect the cardan shaft of the truck to the main pump.

To the power takeout of the truck engine, which usually gives about 10% of the maximum power of the engine, can preferably be connected a smaller pump to keep the hydraulic accumukators charged and to, when driving to the fire site, secure that the hydraulic accumulators will be fully charged. By cold weather the charging pump provides the additional advantage that it after full charge of the accumulators can be connected to circulate the water in the tank, via sequence valves (over-flow valves), to prevent the formation of ice.

The fire truck is preferably also provided with out-takes for so-called hand pistols for manual extinguishing, e.g. in accordance to what is described in the patent application 924119, and likewise with filling automatics for portable hand extinguishers having a capacity of e.g. 5–10 liters, in order to secure final extinguishing of the fire.

The fire fighting installation included in the invention is preferably designed in accordance to what is described in the International Patent Applications PCT/FI92/00060, PCT/FI92/00155, PCT/FI92/00156, PCT/FI92/00193, PCT/FI92/00213, PCT/FI92/00316, PCT/FI92/00317 and PCT/FI92/00330, in desired combination.

It is therefore probably not necessary to show the fire fighting installation in a drawing but the attached drawing shows schematically its preferred embodiment and that of the fire truck included in the invention.

In the drawing the fire fighting installation comprises a delivery arrangement 200 in a unit 100 for delivering high pressure extinguishing liquid to the unit first from an accumulated energy supply arrangement 300 in the unit. The drive engine of the fire truck is indicated by reference numeral 1, a water tank is indicated by 2 and a high pressure pump connected to the water tank is indicated by 3. The pump 3 is arranged to deliver water from the tank 2 to an outlet main line 400 of the delivery arrangement 200 which is connectable by means of a quick-coupling 4. The drive shaft of the pump 3 is indicated by 5.

The cardan shaft of the truck is made in two parts 6 and 7 which are interconnected by means of a quick-coupling 8. The pump 3, with drive shaft 5, is positioned such that the cardan shaft part 6 after demounting the quick-coupling 8 can be shifted, as shown in the drawing by dotted lines, for connection to the drive shaft 5 of the pump by means of a quick-coupling 9, whereafter the whole power of the engine 1 is available to the pump 3.

A number hydraulic accumulators 10 coupled in parallel are likewise connected to the main line going out via the coupling 4. These hydraulic accumulators can be utilized while shifting the cardan shaft to the shaft 5 of the pump.

To the power takeout 11 of the engine 1 is connected a smaller pump 12 which via its out-going line 13 can charge the hydraulic accumulators 10 and, after these having been fully charged, can bring the water of the tank 2 into circulation via an over-flow valve 14. A number of quick-couplings for so-called hand pistols are indicated by 15 and a hose connection is indicated by 16.

The water tank 2 can have a volume of 2000 liters and the main pump 3 can haven an operating pressure of about 130 bar and a volume capacity of about 150 liters/minute, while the charging pump 12 can have an operating pressure of about 200 bar and a volume capacity of about 15 liters/minute. With these exemplifying values, an efficient fire extinguishing can be secured; the fire truck is small and volatile.

I claim:

1. A system for fighting a fire, the system comprising:
   delivery means (200) in a unit (100) for delivering high pressure extinguishing liquid into the unit as fog-like small droplets, whereby to fight a fire in the unit;

first supply means (300) comprising an accumulated energy device in the unit for first supplying the high pressure extinguishing liquid to the delivery means; and a fire truck having final supply means comprising a tank (2) for the extinguishing liquid, a high pressure pump (3) and connecting means (400) for connecting the tank via the high pressure pump to the delivery means and finally supplying the high pressure extinguishing liquid thereto;

wherein:

the high pressure pump (3) has a drive shaft (5), and the fire truck has a drive engine and a cardan shaft (6) from the drive engine (1): and further comprising:

coupling means for coupling the drive shaft to the cardan shaft; and intermediate supply means comprising at least one hydraulic accumulator (10) in the fire truck coupled to the delivery means for supplying the high pressure extinguishing liquid to the delivery means intermediate the first and final supply means.

2. The system according to claim 1, wherein:

the drive engine (1) has a power takeout (11); and further comprising:

a charging pump (12) connected to the power takeout for charging the at least one hydraulic accumulator (10).

3. The system according to claim 2, and further comprising:

pump-coupling means for coupling the charging pump (12) to the tank (2) to supply the high pressure extinguishing liquid from the tank (2) at least after the at least one hydraulic accumulator (10) has reached a full charge pressure.

4. The system according to claim 3, wherein the pump-coupling means comprises an over-flow valve.

5. A system for fighting a fire in a unit (100), the system comprising:

an automatic fire fighting installation in said unit, the automatic fire fighting installation having spraying means (200) in said unit (100) for delivering high pressure extinguishing liquid in the unit as fog-like small droplets, an accumulated energy device (300) in the unit for supplying the spraying means with high pressure extinguishing liquid, said accumulated energy device being part of said automatic fire fighting installation;

a fire truck having an extinguishing liquid tank (2), a high pressure pump (3) and connecting means (6, 9) for connecting the liquid tank via the high pressure pump and a main outgoing line (400) to the spraying means (200) and for supplying high pressure extinguishing liquid thereto; and at least one hydraulic accumulator (10) on the fire truck for supplying the main outgoing line (400) before the connecting means (6, 9) connects the liquid tank (2) via the pump (3) to the spraying means (200).

6. The system according to claim 5, wherein:

the high pressure pump (3) has a drive shaft (5); and the connecting means comprising coupling means (9) for connecting the drive shaft to a cardan shaft (6) of the fire truck.

7. The system according to claim 5, wherein:

the fire truck further comprises a drive engine (1) having a -power takeout (11); and further comprising:

a charging pump (12) connected to the power takeout (11) for charging the at least one hydraulic accumulator (10).

8. The system according to claim 7, and further comprising:

pump-coupling means connecting the charging pump (12) to the liquid tank (2) for bringing the liquid of the tank into circulation after the at least one hydraulic accumulator (10) has been fully charged.

9. The system according to claim 8, wherein:

the pump-coupling means comprises an over-flow valve (14).

* * * * *